United States Patent
Yan et al.

(10) Patent No.: US 9,608,886 B2
(45) Date of Patent: Mar. 28, 2017

(54) METHODS, SYSTEMS, AND PRODUCTS FOR MONITORING DOMAIN NAME SERVERS

(75) Inventors: He Yan, Parsippany, NJ (US); Zihui Ge, Secaucus, NJ (US); Alexandre Gerber, Madison, NJ (US); Oliver Spatscheck, Randolph, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 312 days.

(21) Appl. No.: 13/594,820

(22) Filed: Aug. 26, 2012

(65) Prior Publication Data
US 2014/0059208 A1   Feb. 27, 2014

(51) Int. Cl.
*G06F 15/177* (2006.01)
*H04L 12/26* (2006.01)
*H04L 29/12* (2006.01)

(52) U.S. Cl.
CPC ...... *H04L 43/0817* (2013.01); *H04L 61/1511* (2013.01); *H04L 43/106* (2013.01); *H04L 43/16* (2013.01); *H04L 61/6009* (2013.01)

(58) Field of Classification Search
USPC ........ 709/220, 204, 223, 226, 225; 711/118; 726/25
See application file for complete search history.

(56) References Cited

U.S. PATENT DOCUMENTS

| | | | |
|---|---|---|---|
| 6,035,326 A * | 3/2000 | Miles et al. ................ | 709/206 |
| 6,041,041 A | 3/2000 | Ramanathan et al. | |
| 6,684,247 B1 | 1/2004 | Santos et al. | |
| 7,013,469 B2 * | 3/2006 | Smith et al. ................. | 719/328 |
| 7,017,162 B2 * | 3/2006 | Smith et al. ................. | 719/328 |
| 7,467,230 B2 | 12/2008 | Majumdar et al. | |
| 7,478,148 B2 | 1/2009 | Neerdaels | |
| 8,069,225 B2 * | 11/2011 | McCanne et al. ........... | 709/219 |
| 8,117,296 B2 | 2/2012 | Liu et al. | |
| 8,176,186 B2 * | 5/2012 | McCanne et al. ........... | 709/228 |
| 8,315,589 B2 * | 11/2012 | Li et al. .................... | 455/404.1 |
| 8,402,085 B2 * | 3/2013 | McCanne et al. ........... | 709/202 |
| 8,700,729 B2 * | 4/2014 | Dua .............................. | 709/217 |
| 8,843,536 B1 * | 9/2014 | Elbaz ................ | G06F 17/30887 |
| | | | 705/26.1 |
| 2002/0078045 A1 * | 6/2002 | Dutta .............................. | 707/7 |
| 2004/0044791 A1 * | 3/2004 | Pouzzner ..................... | 709/245 |
| 2004/0215746 A1 * | 10/2004 | McCanne et al. ........... | 709/219 |
| 2005/0044213 A1 | 2/2005 | Kobayashi et al. | |
| 2005/0240943 A1 * | 10/2005 | Smith et al. ................. | 719/328 |
| 2005/0246716 A1 * | 11/2005 | Smith et al. ................. | 719/315 |
| 2006/0184640 A1 | 8/2006 | Hatch | |
| 2007/0208877 A1 | 9/2007 | Kelley et al. | |
| 2008/0281908 A1 * | 11/2008 | McCanne et al. ........... | 709/203 |
| 2008/0320151 A1 * | 12/2008 | McCanne et al. ........... | 709/228 |
| 2010/0106833 A1 | 4/2010 | Banerjee et al. | |
| 2010/0257024 A1 | 10/2010 | Holmes et al. | |

(Continued)

*Primary Examiner* — Tammy Nguyen
(74) *Attorney, Agent, or Firm* — Scott P. Zimmerman, PLLC

(57) ABSTRACT

Methods, systems, and products infer performance of a domain name system. Queries to, and responses from, the domain name system are logged and categorized. Each category is associated with a different performance issue related to the domain name system. The number of entries in each category may be used to infer the performance of the domain name system.

15 Claims, 16 Drawing Sheets

(56) References Cited

U.S. PATENT DOCUMENTS

| | | | |
|---|---|---|---|
| 2010/0274970 A1* | 10/2010 | Treuhaft | H04L 29/12066 711/118 |
| 2011/0076982 A1* | 3/2011 | Li et al. | 455/404.1 |
| 2011/0270964 A1 | 11/2011 | Huang et al. | |
| 2012/0017090 A1 | 1/2012 | Gould et al. | |
| 2012/0042381 A1 | 2/2012 | Antonakakis et al. | |
| 2012/0110148 A1 | 5/2012 | Liu et al. | |
| 2012/0158969 A1* | 6/2012 | Dempsky | H04L 61/6013 709/226 |
| 2012/0197965 A1* | 8/2012 | McCanne et al. | 709/202 |
| 2012/0303808 A1* | 11/2012 | Xie | H04L 63/0236 709/225 |
| 2013/0246508 A1* | 9/2013 | McCanne et al. | 709/203 |
| 2013/0275570 A1* | 10/2013 | Treuhaft | H04L 61/1511 709/223 |
| 2014/0215628 A1* | 7/2014 | Yan | H04L 61/1511 726/25 |
| 2015/0019708 A1* | 1/2015 | Denis | H04L 43/04 709/224 |
| 2015/0256508 A1* | 9/2015 | Townsend | H04L 61/20 709/245 |
| 2015/0256608 A1* | 9/2015 | Nowell | H04L 67/10 709/204 |

\* cited by examiner

METHODS, SYSTEMS, AND PRODUCTS FOR MONITORING DOMAIN NAME SERVERS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The domain name system (or "DNS") maps domain names to network addresses. When a device queries for a domain name (such as www.att.com), the domain name system resolves the domain name into a corresponding network address. Sometimes, though, domain name resolution fails.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
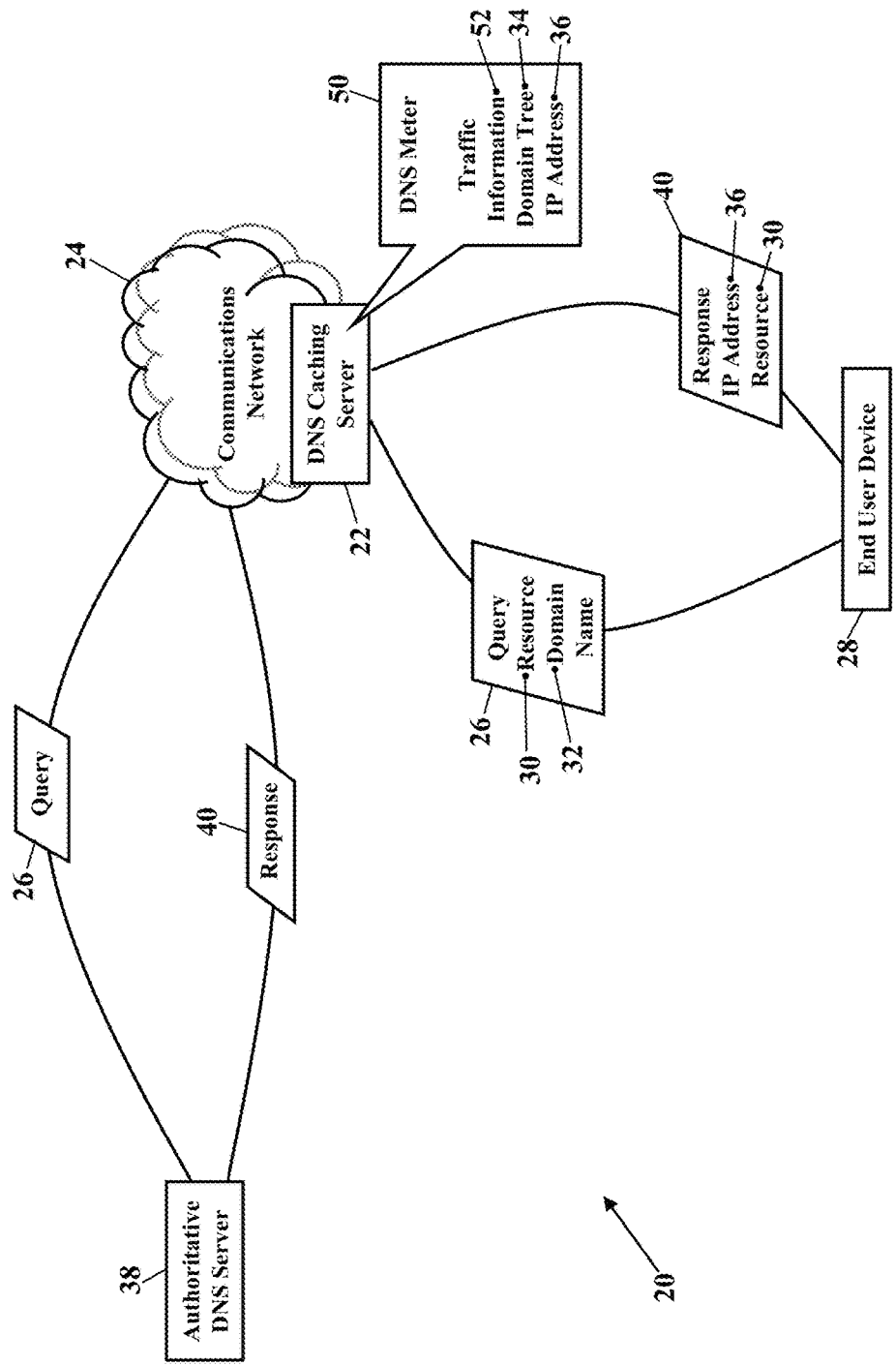
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that monitors a domain name system 20. The domain name system 20 is commonly called "DNS" from its acronym. A DNS caching server 22 communicates with a communications network 24 and intercepts a query 26 sent from a device, such as an end-user device 28. The query 26 typically requests some resource 30 from a domain name 32. The query 26 routes to an address associated with the DNS caching server 22. The DNS caching server 22 queries a domain tree 34 for the domain name 32 specified in the query 26. The domain tree 34 is a logical relationship that maps, relates, or associates host names to Internet Protocol ("IP") addresses. The domain tree 34 is thus a database table or record that resolves resources to addresses. If the domain name 32 is locally cached in the DNS caching server 22, then the domain tree 34 responds with the IP address 36 associated with the domain name 32 specified in the query 26. If the locally stored domain tree 34 fails to resolve the domain name 32, then the DNS caching server 22 may forward the query 26 to an authoritative DNS server 38. The authoritative DNS server 38 then responds with the IP address 36. Regardless, once that the IP address 36 is known, the DNS caching server 22 sends a response 40 to the requesting device (such as the end-user device 28). The response 40 may include the IP address 36 and/or the requested resource 30. Regardless, the response 40 routes through the communications network 22 to an address associated with the end-user device 28. The domain name system 20 has thus resolved the requested domain name 32 into its corresponding IP address 36. The domain name system 20 is generally well known, so a detailed explanation is not necessary for this disclosure.

Exemplary embodiments, though, monitor the quality of the domain name system 20. Sometimes domain name resolution fails, so exemplary embodiments help determine the causes of the failures. As FIG. 1 illustrates, a DNS Meter 50 may be configured within the domain name system 20. While the DNS Meter 50 may operate within any device in the communications network 24, FIG. 1 illustrates the DNS Meter 50 operating within the DNS caching server 22. Regardless, the DNS Meter 50 passively monitors IP traffic information 52 to determine the performance of the domain name system 20. The DNS Meter 50, for example, observes the query 26 and the response 40. The DNS Meter 50 collects various traffic information 52 associated with the query 26 and with the corresponding response 40 (as later paragraphs will explain). The DNS Meter 50 cumulatively collects this traffic information 52 for thousands, even millions, of the queries 26 and the responses 40. The DNS Meter 50 analyzes all this traffic information 52 to infer the performance of the domain name system 20.

Figure 2:
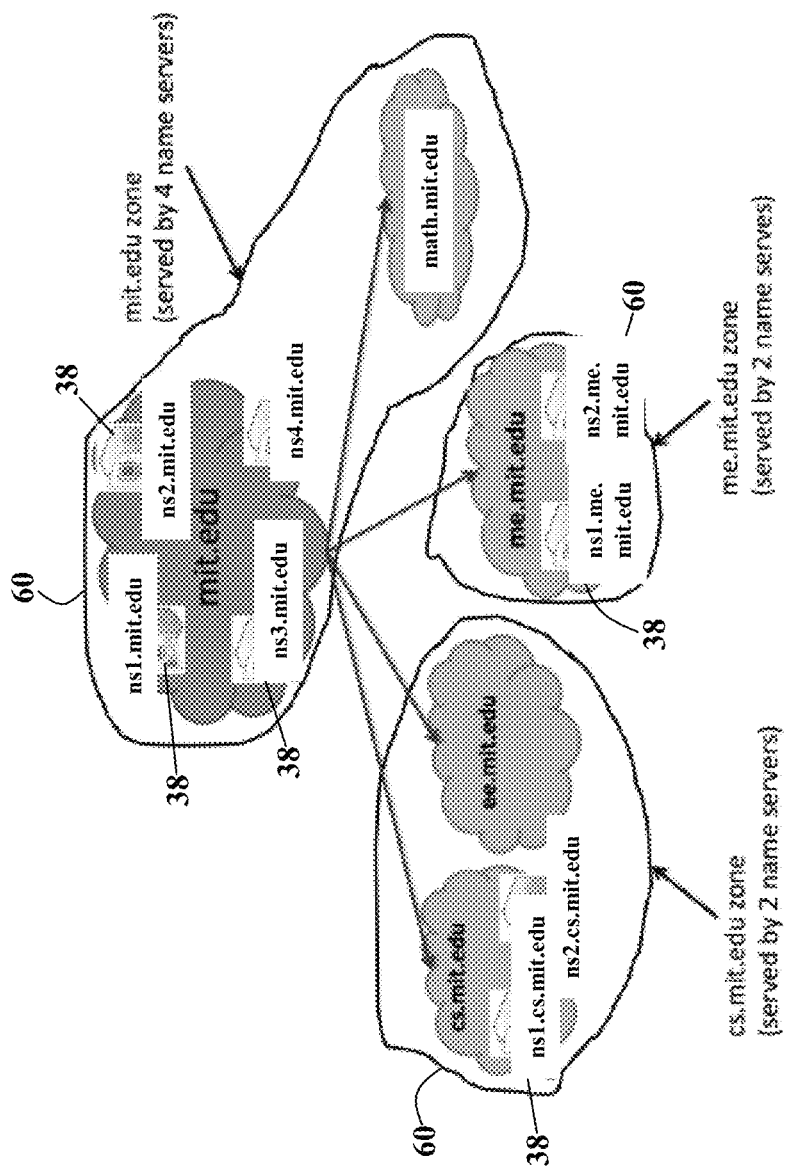
FIG. 2 is a schematic illustrating zonal divisions of domains, according to exemplary embodiments.

FIG. 2 is a schematic illustrating zonal divisions of domains, according to exemplary embodiments. In order to manage the domain name system 20 in a scalable and effective way, exemplary embodiments may divide the domain tree (illustrated as reference numeral 34 in FIG. 1) into different zones 60 according to some administrative authority boundaries. Each zone 60 may be served by one or more authoritative name servers 38, in most cases. FIG. 2, for examples, illustrates the mit.edu domain and some of its sub-domains (cs.mit.edu, ee.mit.edu, me.mit.edu, and math.mit.edu). These sub-domains may be divided into three zones 60 to facilitate management of the domains. Not every domain, however, lives in its own zone. For example, if the math department is not yet ready to manage its own domain (e.g., math.mit.edu), the zone mit.edu may contain the information regarding the sub-domain math.mit.edu (as FIG. 2 illustrates). The same situation can happen to the sibling domains as well. For example, ee.mit.edu domain lives in the same zone 60 as its sibling domain cs.mit.edu. Exemplary embodiments may be applied to any zonal division, as there is no standard definition on how to divide domains into the zones 60. Any division may depend on how the administrative authority is delegated.

FIG. 2 also illustrates authoritative name servers 38. Each zone 60 may be served by one or more authoritative name servers 38 that are typically geographically distributed. Dividing the large domain tree 34 into multiple zones 60, each zone 60 of which is served by the one or more authoritative name servers 38, also improves name resolution performance and service reliability by distributing requests among multiple servers. This may be a simple explanation, though, as the domain tree 34 is normally complex. As later paragraphs will explain, for example, the Microsoft Corporation has several hundred domains that are managed in several dozen zones. Moreover, due to the popularity of content delivery network (e.g., domain "www.microsoft.com" is managed by the zone "akadns.net") and business acquisition (e.g., domain "www.youtube.com" is managed by the zone "google.com"), one domain could be managed by a zone 60 that is not under the same branch in the domain hierarchy.

Figure 3:
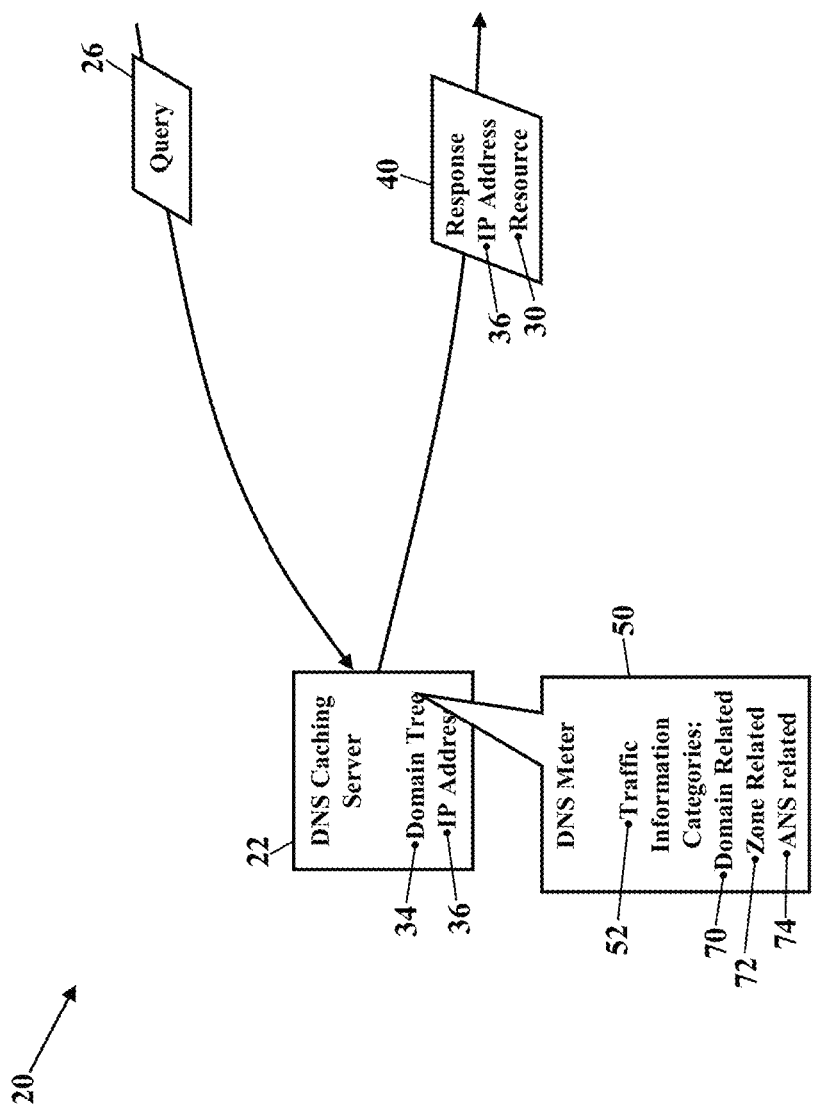
FIG. 3 is a schematic illustrating categorization of domain name resolution, according to exemplary embodiments.

FIG. 3 is a schematic illustrating categorization of domain resolution, according to exemplary embodiments. Understanding the relations among the domain names (illustrated as reference numeral 32), the zones 60, and the authoritative name servers 38 is important in order to leverage passive measurements to monitoring the DNS quality. Different types of DNS issues are only revealed if we look into the larger number of the DNS request queries 26 and the responses 40 from the right angles. Largely, DNS issues can be classified into three categories: "domain related," "zone related," and "authoritative name server related."

The "domain related" category 70 includes issues of one or multiple unreachable domains. "Domain related" issues are typically caused by typos or mis-configurations in the zone file, which contains all the information of domains under the corresponding zone 60 and the glue logic to child zones. For example, if the "A" record for the domain "www.cs.mit.edu" has a typo, "www.cs.mit.edu" would be isolated. Similarly if the "NS" record for "cs.mit.edu" is not configured correctly, "www.cs.mit.edu" and "smtp.cs.mit.edu" would be unreachable. These types of issues may only be visible if error codes are analyzed related to DNS responses associated with individual domains.

Issues that bring down an entire zone are categorized in the "zone related" category 72. Malformed or illegal resource records in the zone file can invalidate the entire zone that results in the isolation of all the domains under this zone. For example, if someone enters a CNAME for a MX records or adds a TXT record for an existing CNAME record, the zone file will be invalid as well. A corrupted zone file could bring done the entire zone as well. For example, any glitches during regular zone update or transfer could get the zone file corrupted. Moreover, any inconsistency in the glue logic that links parent zone and child zone together could take down in the entire child zone. For example, if the NS records configured at mit.edu zone do not match the NS records configured at its child zones (see FIG. 1), the domains managed in the child zone would not be reachable. These types of issues are only detectable if we group and analyze the DNS responses from the zone's point of view. For example, grouping of all the DNS responses 40 associated with the same zone 60 and analyze the error codes in the responses 40.

The "authoritative name server related" category 74 relates to path problems. Sometimes issues arise that are typically caused by problems on the path between the resolver (e.g., the DNS caching server 22) and the authoritative DNS server 38. For example, if the routing path changes between the caching resolver and "ns1.mit.edu" (see FIG. 1), or if the processor is overloaded on "ns1.mit.edu," the response time of any DNS request that is directed to "ns1.mit.edu" would be impacted. These types of performance issues may only be visible if the DNS responses 40 are grouped and analyzed from a particular authoritative DNS server 38. In this example, the performance issue is only pronounced if all the DNS responses 40 from "ns1.mit.edu" are grouped and an average response time is calculated.

Figure 4:
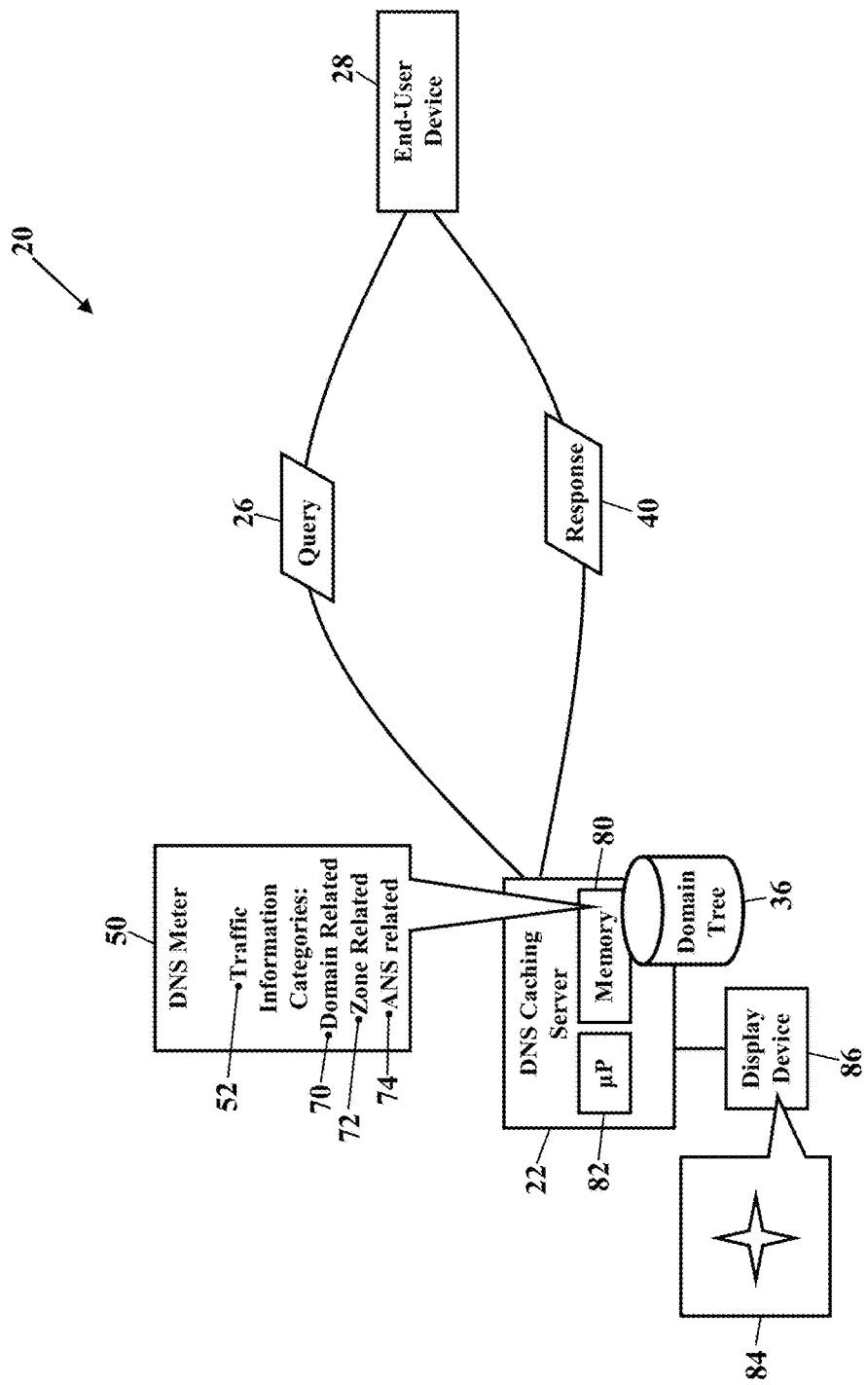
FIGS. 4-6 are more detailed schematics illustrating the operating environment, according to exemplary embodiments.
Figure 5:
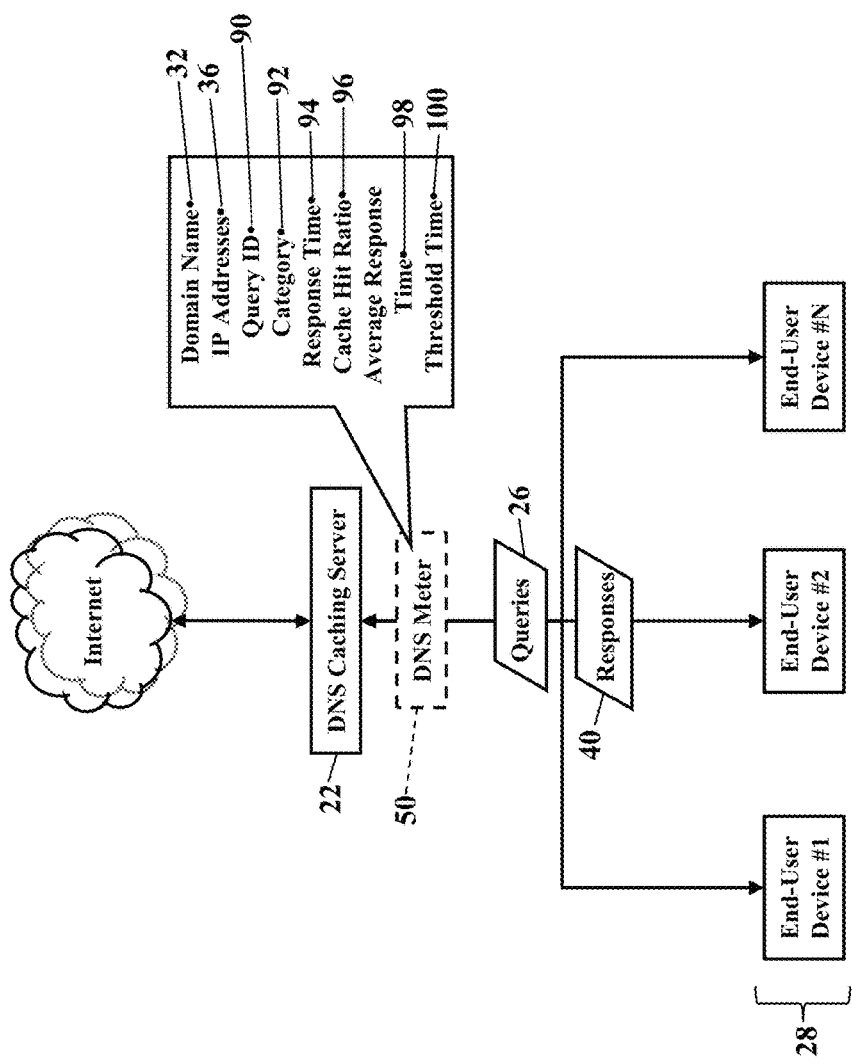
Figure 6:
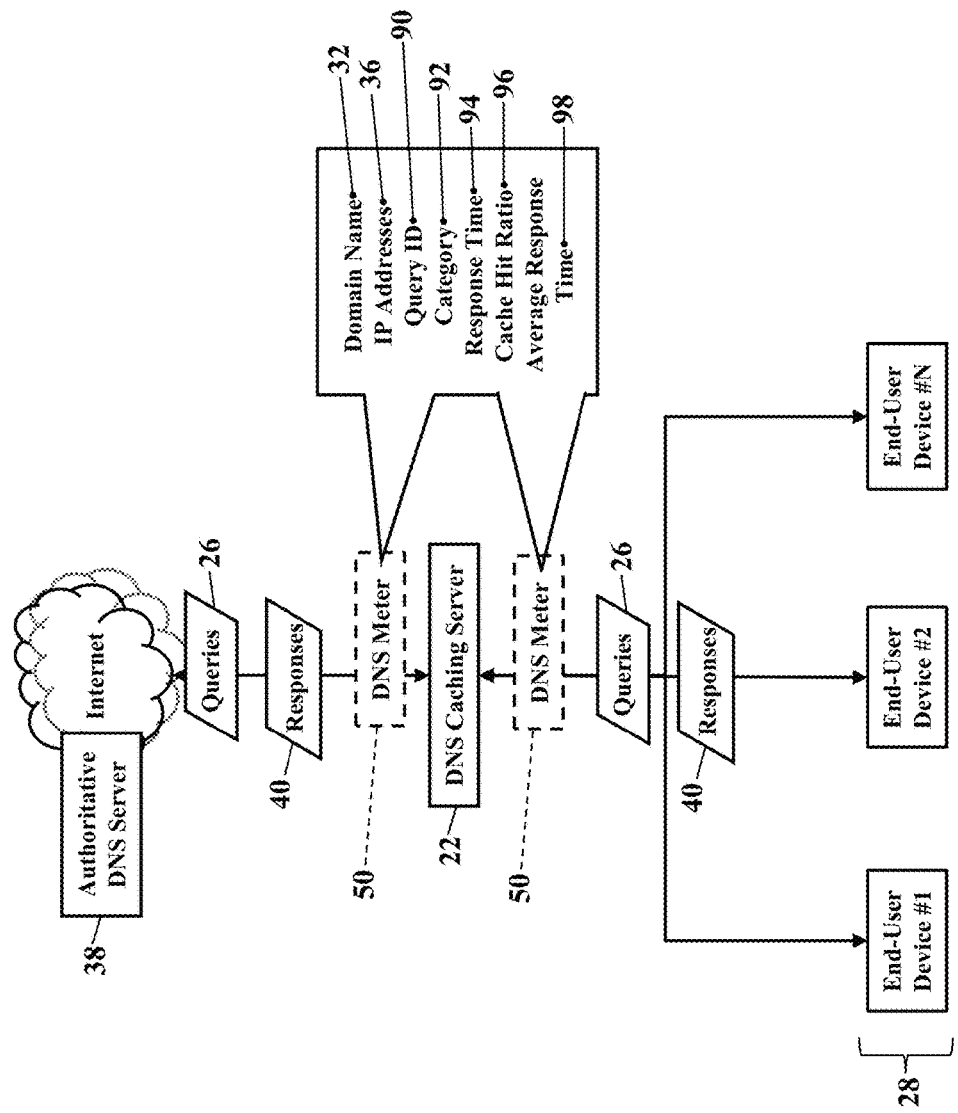

FIGS. 4-6 are more detailed schematics illustrating the operating environment, according to exemplary embodiments. Here the DNS Meter 50 is co-located with the DNS caching server 22. That is, the DNS Meter 50 is a software application that stores in memory 80 of the DNS caching server 22. A processor 82 (e.g., "μP"), application specific integrated circuit (ASIC), or other component that executes the programming associated with the DNS Meter 50. The DNS Meter 50 thus comprises instructions or code that cause the processor 82 to monitor all the request queries 26 received by, and all the responses 40 sent by, the DNS caching server 22. The DNS Meter 50 may even cause the processor 82 to visually produce a graphical user interface ("GUI") 84 on a display device 86, yet the graphical user interface 84 may also have audible features. The DNS Meter 50, however, may operate in any processor-controlled device, as later paragraphs will explain. Moreover, although the DNS Meter 50 is illustrated as co-located, the DNS Meter 50 may store within and be executed by any device or component capable of monitoring queries to, and responses by, the domain name system 20.

Exemplary embodiments passively extract different DNS metrics. The DNS caching server 22 resolves the queries 26 from the end-user devices 28 in a recursive manner by asking the authoritative name servers 38 iteratively and caches the responses 40 to improve the performance. FIG. 5 thus illustrates one architecture in which the DNS Meter 50 only captures the DNS queries 26 and responses 40 between the end-user devices 28 and the DNS caching server 22. FIG. 6 is a similar architecture, but here the DNS Meter 50 also captures and extracts the DNS queries 26 and responses 40 that are sent between the DNS caching server 22 and the authoritative name servers 38. While the architectures are similar, the architecture illustrated in FIG. 6 provides more detailed information (e.g., which authoritative name server 38 is used in each iteration of a query), but the architecture of FIG. 6 is also more complex and more costly to deploy. Regardless, exemplary embodiments may monitor either architecture.

For each query 26, the DNS Meter 50 maps it to the corresponding response 40. The DNS Meter 50 monitors, extracts, and logs each query 26 and response 40, by using the domain name 32, the end-user device's IP address 36, and a query ID 90 as the key. Each query 26 that successfully maps to an entry in the domain tree 34, and/or its corresponding response 40, is categorized into a category 92, as shown in Table 1 below.

TABLE 1

Category by Error Code in Response

| Error Code | Description |
| --- | --- |
| No error | The request completed successfully. |
| Format error | The name server was unable to interpret the query. |
| Server failure | The name server was unable to process this query. |
| Name Error | The domain name referenced in the query does not exist. |
| Not Implemented | The name server does not support the requested kind of query. |
| Refused | The name server refuses to perform the specified operation for policy reasons. |

If the query 26 cannot be matched to its response 40, the query 26 may be uniquely categorized into a "no response" category. Moreover, for each query 26 with response 40, the DNS Meter 50 calculates a response time 94 of the name resolution. Because the DNS caching server 22 time stamps the query 26 and the response 40, the DNS Meter 50 may compare the two time-stamps associated with the query 26 and the corresponding response 40. With all the above information, given all the queries 26 for the same domain name 32 in each 5-minute interval, exemplary embodiments sum the number of queries 26 in each category 92 (e.g., the categories in Table 1 and the "no response" category). A cache hit ratio 96 is calculated based on the number of domain names 32 and IP addresses 36 that are already locally stored in a cache portion of the memory of the DNS caching server 22. The DNS Meter 50 may also calculate an average response time 98 for all cache-missing queries. With the architecture of FIG. 5, exemplary embodiments may infer that a query misses the cache if the response time 94 is longer than some threshold time 100 (such as 5 ms). As the DNS caching server 22 is co-located with the DNS Meter 50, and typical lightly-loaded, any query 26 that hits the cache should not require more than 5 ms for the response 40. Indeed, test results show that 78% of queries in a day have response times less than 5 ms. With the architecture of FIG. 6, the cache hit ratio 96 may be estimated in a more accurate way by correlating the queries received (from the end-user devices 28) and queries sent (to the authoritative name servers 38) by the DNS caching server 22 regarding the same domain around the same time. The response time of cache-hit queries may not be of interest, as the response time 94 does not reflect anything other than the path between end-user devices 28 and the caching servers.

Figure 7:
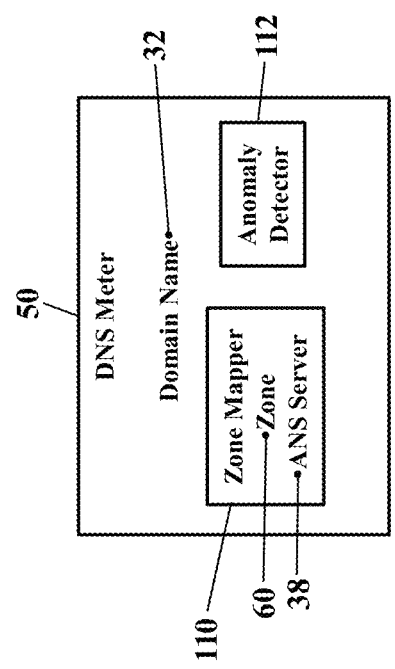
FIG. 7 is a block diagram illustrating a DNS Meter, according to exemplary embodiments.

FIG. 7 is a block diagram further illustrating the DNS Meter 50, according to exemplary embodiments. The DNS Meter 50 has two major components, a zone mapper 110 and an zone mapper 112.

The zone mapper 110 groups domains that are managed in the same zone 60 together. With the architecture of FIG. 5, the zone mapper 110 runs the "DIG" command against the co-located DNS caching server 22 for each domain when it is first seen by the DNS Meter 50. As those of ordinary skill in the art understand, the "DIG" command is an acronym for a domain information groper line tool that obtains domain name information. The zone mapper 110 determines a set of the authoritative name servers 38 that serve this domain. The set of names of authoritative name servers 38 is used as an identifier of the zone 60 for this domain. For example, for the domain "www.facebook.com," the set of authoritative name servers that define the zone 60 is "glb1.facebook.com" and "glb2.facebook.com." The DNS Meter 50 may always use the default record type "A" when it runs the "DIG" command, as it only cares about the authoritative name servers instead of a particular resource record. For example, for domain "facebook.com," even if the "A" record for "facebook.com" is non-existent, the "DIG" command still returns the set of authoritative name servers 38 for "facebook.com."

The DNS Meter 50 enables a trace option to avoid caching when it runs the "DIG" command. Caching could return the set of authoritative name servers 38 for the parent domain in some cases. As a side effect of enabling the trace option, special handles are needed for "CNAME" records. For example, for the domain "www.hotmail.com," the first run of the "DIG" command returns a "CNAME" record of "www.hotmail.com" that points it to domain "dispatch.kahuna.glbdns.microsoft.com." In order to group "www.hotmail.com" into the right zone 60 that determines its reachability, DNS Meter 50 runs the "DIG" command again for "dispatch.kahuna.glbdns.microsoft.com" and groups "www.hotmail.com" into the zone 60 identified by the set of authoritative name servers 38 returned by this run of the "DIG" command. After the first appearance of a domain, the zone mapper 110 digs it only after the TTL associated with its "NS" records expired.

The approach for the architecture of FIG. 6 may be easier. Instead of actively digging the domains, the zone mapper 110 learns the mapping passively over time by leveraging the authority section in the responses 40 from authoritative name servers 38. Note currently zone mapper 110 only maps the domain to the last zone 60 in the chain of name resolution instead of all zones 60 in the chain. In the above example, both zones identified by two sets of authoritative name servers 38 returned by two runs of the "DIG" command are part of the chain of name resolution for domain "www.hotmail.com." Future research is planned in this area.

The zone mapper 112 is now explained. The goal of the zone mapper 112 is to detect the anomalies associated with the domain names 32, the zones 60, and the authoritative name servers 38 in the following metrics: the number of queries 26 with different erroneous responses 40 (as defined in Table 1), the number of queries 26 with no response, and the response time 94 for each query 26. Localizing the problem to the domain name 32, the zone 60, and/or the authoritative name server 38 greatly helps the root cause analysis. For each 5-minute interval, the zone mapper 112 first aggregates the metrics associated with individual domains to parent domains (simply using the domain hierarchy), zones 60 (using the output from the zone mapper 110) and authoritative name servers 38 (only available with the architecture if FIG. 6, where authoritative name servers are visible). For example, for each 5-minute interval, the numbers of "name error" categorical responses associated domains "www.faceback.com" and "api.facebook.com" are added up or summed as the number of "name error" responses associated with their parent domain "facebook.com," their shared zone 60 identified by the zone mapper 110 and the common authoritative name server 38. We can imagine that in this way each domain name in the domain hierarchy, each zone 60 and each authoritative name server 38 would have a time-series for each metric over time. Now the question is how to detect anomalies for the large number of metric time series in a realtime streaming fashion. There are a wide range of time series anomaly detection algorithms in the literature, ranging from Box-Jenkins linear time-series forecasting techniques, to frequency domain Fourier analysis or Wavelet analysis based approaches, to structural analysis such as principal component analysis. Due to the scale (the number of domains, zones and authoritative name servers) of our application, it is desirable to have online anomaly detection with minimal runtime complexity and memory requirement. Exemplary embodiments may adopt the classic additive Holt-Winters (HW) algorithm, which is a widely used one-pass online time series forecasting method. Specially, the Holt-Winters algorithm is called every five minutes for each metric of each domain, zone, or authoritative name server to pick up the anomalies in them.

Figure 8:
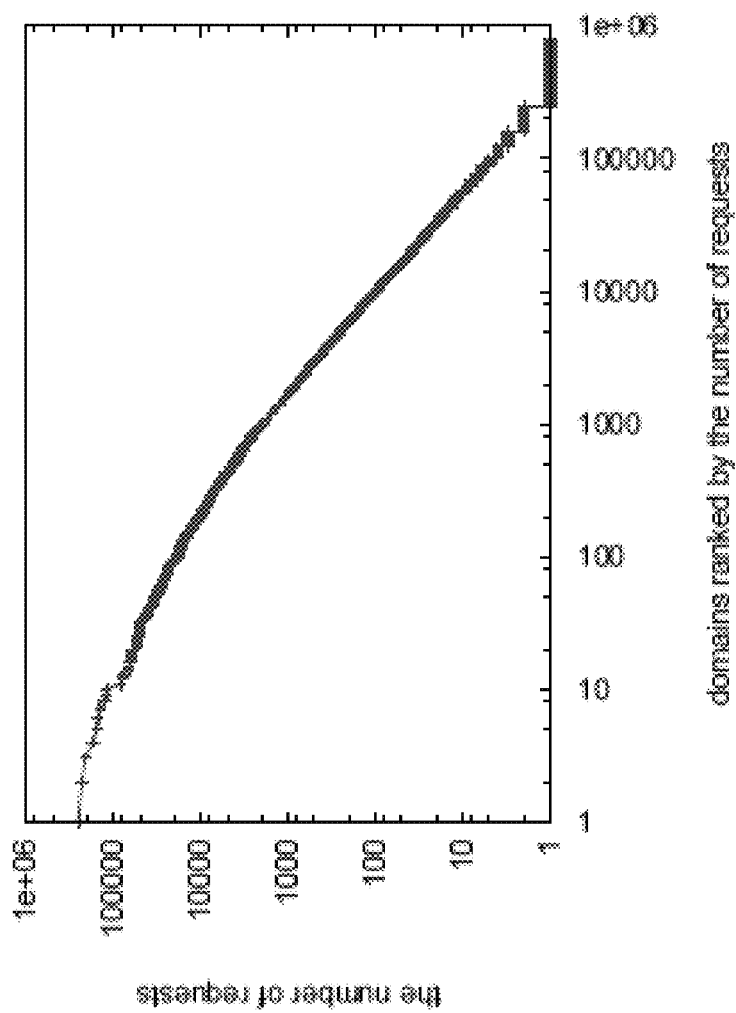
FIGS. 8-13 are charts illustrating experimental results using the DNS Meter, according to exemplary embodiments.

FIGS. 8-13 are charts illustrating experimental results using the DNS Meter 50, according to exemplary embodiments. These experimental results were obtained from the DNS Meter 50 executing at one of a tier-1 Internet Service Provider's DNS caching resolvers. During the experiment, the DNS Meter 50 observed 15,561,300 queries 26 for 781,229 distinct valid domain names on Jun. 1, 2011. FIG. 8 plots the popularity of the DNS domains (measured by the number of query requests). The linear decrease (in log-log scale) of the domain popularity to their rank indicates that DNS domain popularity can be well modeled using the known Zipf model (with $\alpha=1.28$)—a widely recognized phenomenon in the popularity distribution of many kinds of Internet objects.

Figure 9:
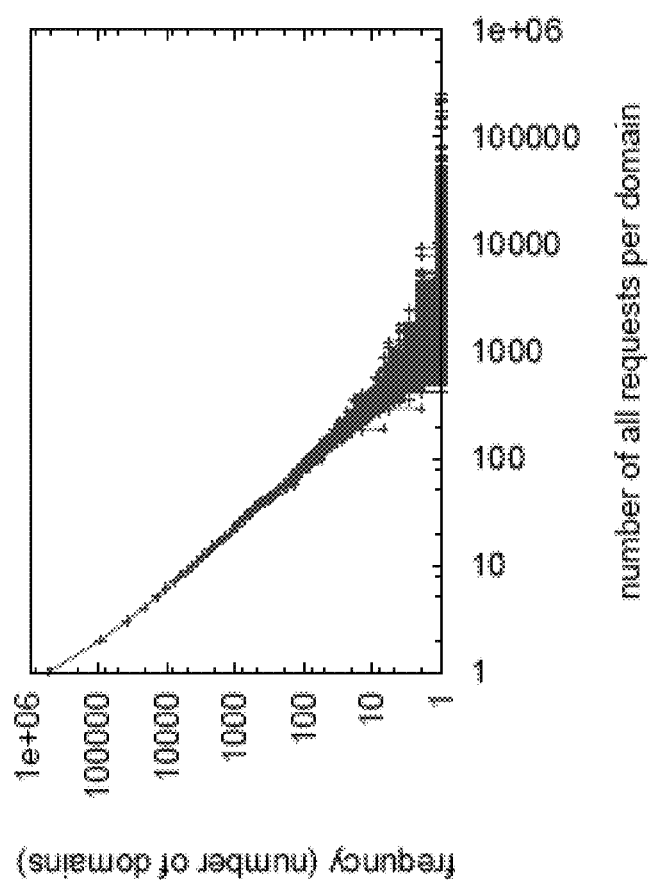

FIG. 9 illustrates the counts (frequencies) of DNS domains of varying popularity. Intuitively, the inventors expect to see a small number of very popular domains and a large number of unpopular domains. Indeed, the DNS Meter 50 observed another power-law characteristic—a well fitted linear trend in log-log scale with the exponent $\alpha=(-1.68)$ over several orders of magnitude. Now, with a mixture of a few popular domains (the elephants) and many unpopular ones (the mice), the DNS Meter 50 helps determine which domains contribute more to the total number of DNS requests.

Figure 10:
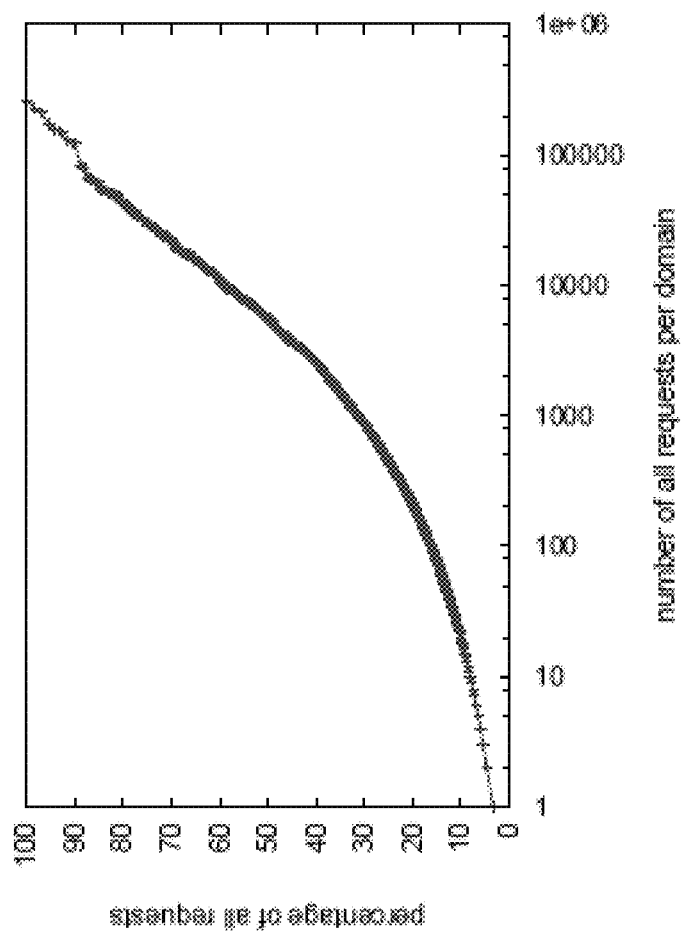

FIG. 10 illustrates the CDF of the total number of requests with domains sorted by increasing popularity. The DNS Meter 50 determined that 16% of the queries 26 were for domains that have one hundred (100) or less requests (e.g., "mice"), while 41% of the queries 26 were for popular domains having above ten thousand (10,000) requests in the day (e.g., "elephants"). Table 2 below shows the top five requested domains.

TABLE 2

Top 5 Domains seen by DNS Meter on Jun. 1, 2011

| Domain Name | # of requests (%) |
|---|---|
| www.facebook.com | 256904 (1.7%) |
| www.weather.com | 229871 (1.5%) |
| www.belkin.com | 211780 (1.4%) |
| www.yahoo.com | 172467 (1.1%) |
| liveupdate.symanteliveupdate.com | 156860 (1.0%) |

The vast majority of all the queries 26 are thus for the top five domains. Conversely, a large fraction (67.5%) of the domains only have a single request during the day. Internet service providers may thus be challenged to continuously monitor all the domains. In order to address this challenge, the DNS Meter 50 may group individual queries 26 by parent domains, the zone 60, and authoritative name servers 38. As the above paragraphs explained, all the queries 26 may be categorized into one of seven (7) different categories 92 (e.g., "no error," "format error," "server failure," "name error," "not implemented," "refused" and "no response"). Table 3 below lists the breakdown of all seven categories 92, and the "no error" category dominates as one might expect.

TABLE 3

Categories of 15,561,300 queries on Jun. 1, 2011

| Type | Percentage(%) |
|---|---|
| No error | 93.4 |
| Format error | 0 |
| Server failure | 1.0 |
| Name Error | 5.3 |
| Not Implemented | 0 |
| Refused | 0 |
| No Response | 0.3 |

Figure 11:
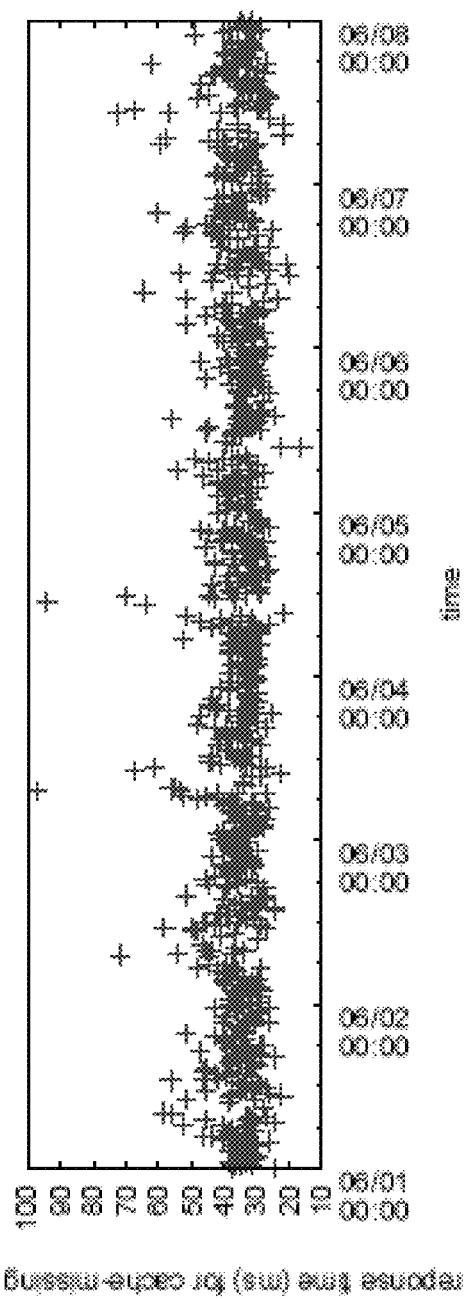

FIG. 11 illustrates the response times 94. Another interesting metric collected by the DNS Meter 50 is the 5-minute average response time 98 for cache-missing requests (defined above) for all the queries 26 other than the "no response" category. As an illustrative example, FIG. 11 plots the 5-minute average response time 98 of cache-missing requests for a 7-day time series for the top one domain "www.facebook.com" (as observed from Jun. 1-7, 2011).

Figure 12:
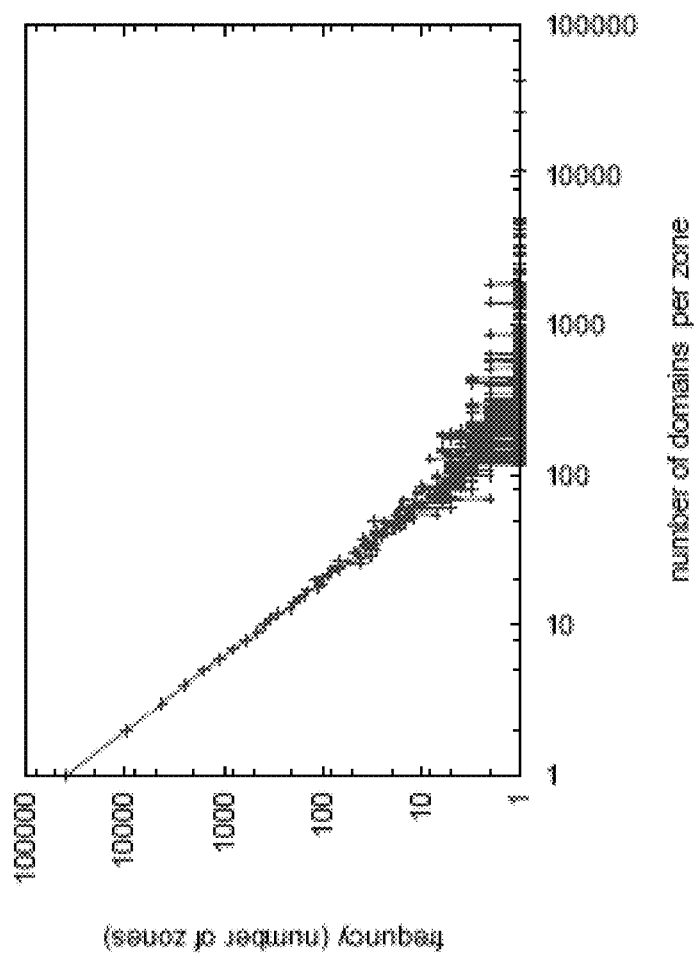

FIG. 12 is a plot of zonal sizes. The DNS Meter 50 reveals relations among domains, zones 60, and authoritative name servers 38. Out of the 781,229 distinct valid domain names 332 observed on Jun. 1, 2011, the DNS Meter 50 was able to map 557,869 of them to the corresponding zones 60. The domains that the DNS Meter 50 failed to map to zones were either due to non-existing domains (e.g., typo or spam) or using dynamic DNS. According to the DNS Meter 50, the 557,869 domains are managed by 64,922 zones. As FIG. 12 illustrates, the log-log histogram of the number of domains per zone 60 reveals another power-law characteristic (with exponent α=−2.03). There were 35,598 (54.7%) zones that contain only one domain in our dataset, meanwhile the largest zone contains as many as 42,923 distinct domains— the largest zone turned out to be "google.com" served by four (4) authoritative name servers 38 ("ns1.google.com," "ns2.google.com," "ns3.google.com," and "ns4.google.com"), including domains such as "blogspot.com," "youtube.com," and "doubleclick.net."

Figure 13:
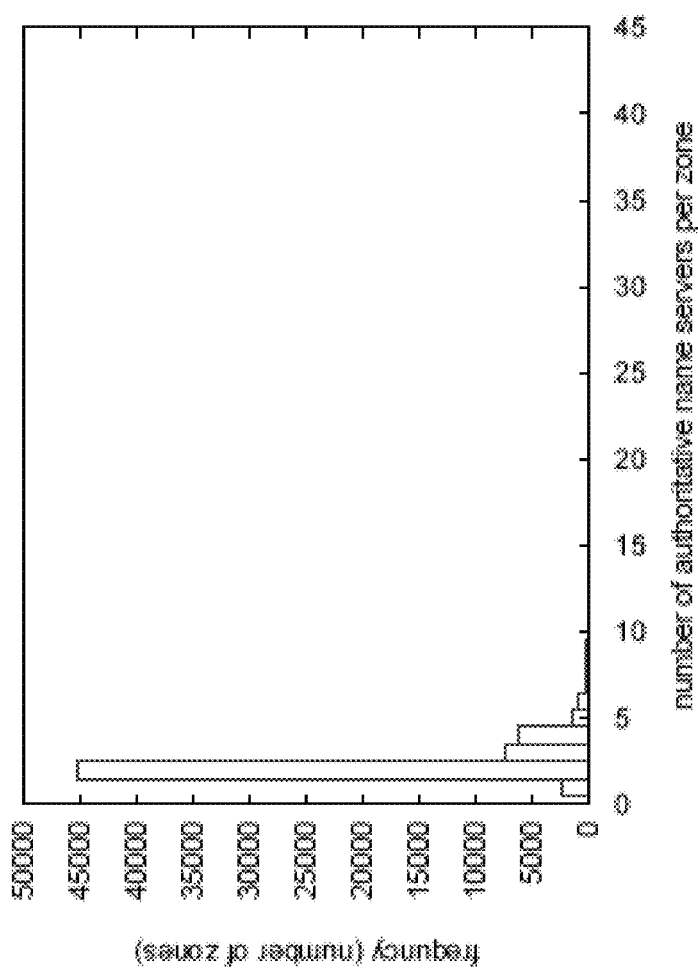

FIG. 13 plots the distribution function of the number of authoritative name servers 38 per zone 60. The DNS Meter 50 observed that the majority (45,138 or 69.5%) of the zones 60 have two (2) authoritative name servers 38.

Figure 14:
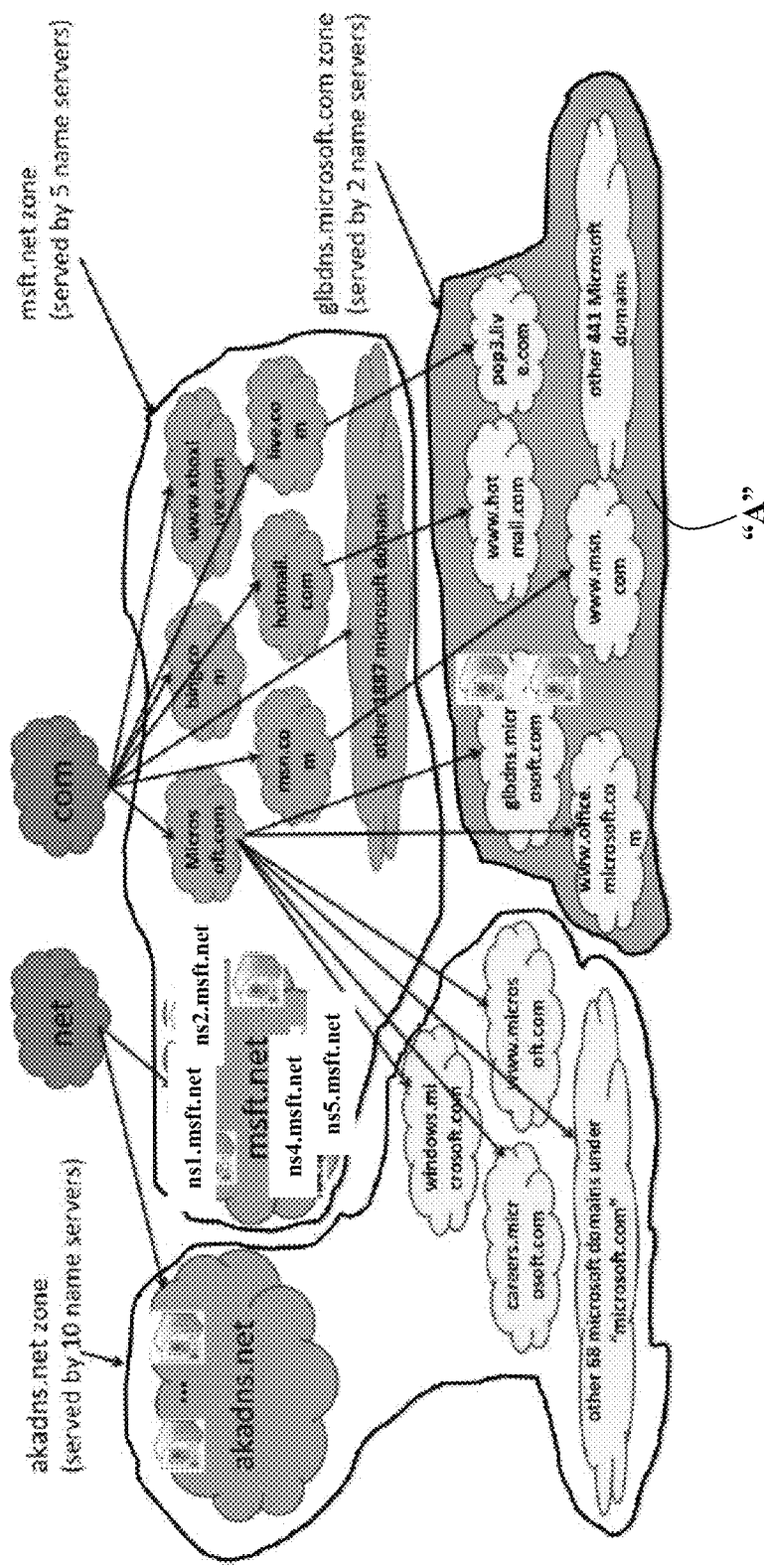
FIGS. 14-15 are schematics illustrating a DNS outage, as observed by the DNS Meter, according to exemplary embodiments.
Figure 15:
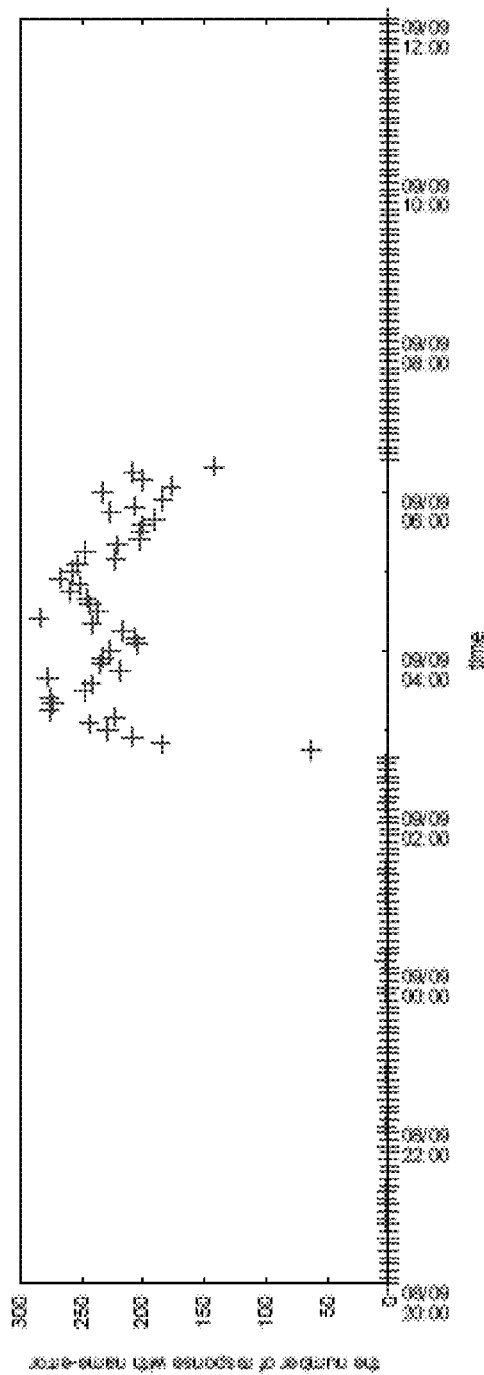

FIGS. 14-15 are schematics illustrating a DNS outage, as observed by the DNS Meter 50, according to exemplary embodiments. Here the inventors discuss a DNS service outage detected by the DNS Meter 50 in near-realtime. Around 02:50 AM, GMT Sep. 9, 2011, the DNS Meter 50 alarmed on the abnormal number of category "name error" responses associated with one of the MICROSOFT® zones "glbdns.microsoft.com." FIG. 14 illustrates the complexity in how MICROSOFT® manages its domains in different zones 60, as revealed by the DNS Meter 50. Zone "A" generated an alarm in the DNS Meter 50. Interestingly, the problem is only visible from the perspective of zone "glbdns.microsoft.com" because individual domains do not have enough queries to detect the issue.

FIG. 15 shows the time series of the number of "name error" responses associated with zone "glbdns.microsoft.com." This DNS outage turned out to have taken down several MICROSOFT® online services and impacted millions of users, according to news reports. The reported outage time was between 03:00 AM GMT and 05:30 AM GMT, while the DNS Meter 50 detected this outage around 02:50 AM GMT. The exact root cause was found to be a corrupted zone file, which perfectly aligns with the alarm that DNS Meter 50 localized to the zone "glbdns.microsoft.com."

Exemplary embodiments thus improve DNS monitoring. The DNS Meter 50 leverages the passively-collected queries 26 and responses 40 to comprehensively monitor DNS from three different dimensions: the domain name 32, the zone 60, and the authoritative name server 38 without being limited to only root and gTLD domains. Exemplary embodiments monitor DNS in a realtime and comprehensive manner. The DNS Meter 50 may be extended along two directions: map each domain in the query 26 to all the dependent domains and zones in the chain of name resolution and make use of the domain/zone hierarchy to better localize the issue.

Figure 16:
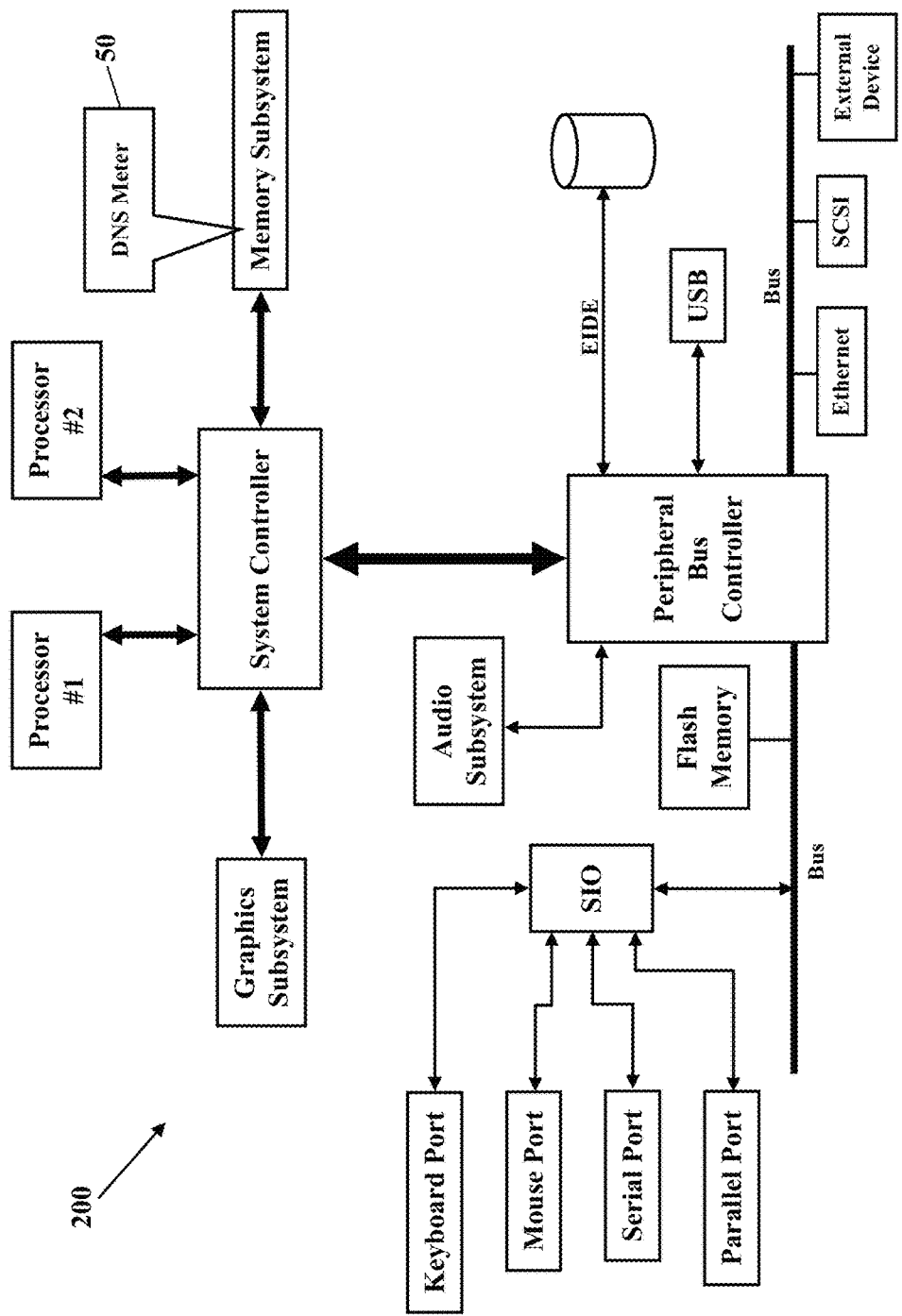
FIG. 16 is a block diagram illustrating a processor-controlled device, according to exemplary embodiments.

FIG. 16 is a schematic illustrating still more exemplary embodiments. FIG. 16 is a generic block diagram illustrating the DNS Meter 50 operating within a processor-controlled device 200. As the paragraphs explained, the DNS Meter 50 may operate in any processor-controlled device 200. FIG. 16, then, illustrates the DNS Meter 50 stored in a memory subsystem of the processor-controlled device 200. One or more processors communicate with the memory subsystem and execute the DNS Meter 50. Because the processor-controlled device 200 illustrated in FIG. 16 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for monitoring DNS traffic information, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
capturing, by a server, queries sent from devices, each one of the queries requesting a domain name resolution of a corresponding domain name;
capturing, by the server, responses generated after performing the domain name resolution;
summing, by the server, a total number of the queries captured;
determining, by the server, that the corresponding domain name is locally stored;
summing, by the server, a cache number of the queries having the corresponding domain name locally stored;
categorizing, by the server, all the responses in a single category in response to the corresponding domain name successfully resolving to an Internet Protocol address; and
uniquely categorizing, by the server, the queries in which the corresponding domain name fails to match a domain tree.

2. The method of claim 1, further comprising time stamping each one of the queries and each corresponding one of the responses.

3. The method of claim 2, further comprising calculating a response time for the domain name resolution.

4. The method of claim 1, further comprising summing a total number of the queries received.

5. The method of claim 1, further comprising determining a ratio of the cache number to the total number.

6. The method of claim 1, further comprising determining a response time for the domain name resolution exceeds a threshold time.

7. The method of claim 6, further comprising inferring the domain name is not locally stored in response to the response time exceeding the threshold time.

8. A system, comprising:
a processor; and
a memory device, the memory device storing code, the code when executed causing the processor to perform operations, the operations comprising:
capturing a query sent from a device, the query addressed to a domain name service server, and the query requesting domain name resolution of a domain name;
capturing a response to the query, the response sent from the domain name service server to the device after performing the domain name resolution;
adding an entry to an electronic map, the electronic map having electronic associations between different queries to the domain name service server and different responses, the entry electronically associating the query to the response and to the domain name;
summing a total number of the different queries to the domain name service server;
summing a cache number of the different queries having a corresponding domain name locally stored;

categorizing the response in a single category in response to the domain name successfully resolving to an Internet Protocol address; and categorizing the query according to an error code in response to the domain name failing to resolve to the Internet Protocol address.

9. The system of claim 8, wherein the operations further comprise time stamping the query and the response.

10. The system of claim 9, wherein the operations further comprise determining a response time for the domain name resolution.

11. The system of claim 8, wherein the operations further comprise determining a ratio of the cache number to the total number.

12. The system of claim 8, wherein the operations further comprise determining a response time for the domain name resolution exceeds a threshold time.

13. The system of claim 12, wherein the operations further comprise inferring the domain name is not locally stored when the response time exceeds the threshold time.

14. A memory device storing instructions that when executed cause a processor to perform operations, the operations comprising:

capturing queries sent to a domain name service server, each one of the queries sent from a device requesting domain name resolution for a corresponding domain name;

capturing responses to the queries sent from the domain name service server generated after performing the domain name resolution;

adding entries to an electronic map, the electronic map having electronic associations between the queries to the domain name service server and the responses, each entry of the entries electronically associating a corresponding query to a corresponding response and to the corresponding domain name;

summing a total number of the queries captured;

summing a cache number of the queries having the corresponding domain name locally stored;

if the corresponding response indicates the corresponding domain name successfully resolves to an Internet Protocol address, then categorizing the corresponding response in a single category; and if the corresponding response indicates the corresponding domain name failed to resolve to the Internet Protocol address, then categorizing the corresponding query according to an error code.

15. The memory device of claim 14, wherein the operations further comprise:

determining a response time for the domain name resolution exceeds a threshold time; and inferring the domain name is not locally stored when the response time exceeds the threshold time.

* * * * *